Nov. 17, 1964  C. M. McKENNEY, JR., ET AL  3,157,108
WARMING AND COOLING RACK
Filed June 13, 1961

INVENTORS
Clarence M. McKenney, Jr. &
Sarah K. McKenney
BY

THEIR ATTORNEYS

United States Patent Office 3,157,108
Patented Nov. 17, 1964

3,157,108
WARMING AND COOLING RACK
Clarence M. McKenney, Jr., and Sarah K. McKenney, both of 6631-A Ridgeville St., Pittsburgh, Pa.
Filed June 13, 1961, Ser. No. 116,864
4 Claims. (Cl. 99—339)

This application relates to a warming and cooling rack, and primarily adapted for attachment to pop-up toasters. The rack carries spaced apart supporting brackets providing a three point suspension and adapting it to support articles with stability both when the rack is secure upon the toaster, and when placed aside and resting with its brackets upon a flat supporting surface.

Ovens and other attachments for bread toasters have been proposed in the past, the intended use being to store therein the hot toast which has been made, so as to keep it from immediately cooling off. The acceptance of these attachments has not been extensive, and certainly not for pop-up toasters; for one thing, the contents of these portable type ovens are in the way of the next up-coming slices of toast and hence the oven must be removed with each toasting so as to clear the toaster. To minimize the bother of these manipulations, the ovens hitherto have had means impositively connecting them to a toaster in order to avoid the evident difficulties otherwise encountered in making the frequent removals necessary.

In contrast, this invention provides a very stable means of connection to a toaster, the three point connection indicated being positive and secure enough that the instant rack serves as a very versatile attachment. It makes possible uses having in fact little or no relation to the toast itself. More particularly, the present rack, consisting of parallel supporting wires set in a uniplanar grating frame, has such effective convective properties in its position on a toaster that the toaster, when its slots are empty, has specific utility to warm cold plates if placed on the rack, or to soften butter, to warm pans of pastries or bread, or to thaw frozen meat. In other words, the toaster in this phase of its operation is cycled through empty runs, as many as desired, with the sole purpose being to operate the heating elements in the toaster through time periods as a heater, not as a toaster. In this manner, we obviate the need of lighting or warming up the oven of a kitchen range which, according to the prior practice, is the structure employed for the heating and for thawing the various items named.

Preferably, the pattern of the supporting wires is non-uniform in the frame of the present rack to the extent that certain wires are omitted in the vicinity of the toaster slot. Thus, the rack can be left empty so as not to be used as a supporting rack for a time, and the toaster functions without being impeded in its toaster function; conversely when the toaster is empty of slices of bread and is unneeded for its toaster function, the rack readily functions for supporting objects above the toaster.

In its cooling capacity, the same convective properties of our rack are equally effective. That is to say, cookies, pies, etc., which come from the regular range oven are readily cooled on the rack because all that is necessary is to remove it from the toaster and place it nearby on a table or other flat surface for holding the cookie sheets and so forth. For that matter, if the toaster is cool due to having been idle a long while, the rack can be left in place so as to be employed as a cooling rack right on the toaster.

Other features, objects, and advantages will either be specifically pointed out or become apparent when, for a better understanding of the invention, reference is made to the following description taken in conjunction with the accompanying drawings in which.

Figure 1:
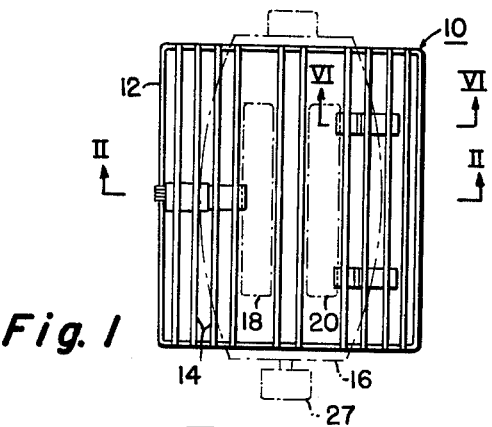
FIGURES 1 and 2 are plan and transverse sectional views of the rack applied to a toaster, the transverse sectional view being taken along the lines II—II of FIGURE 1.
Figure 3:
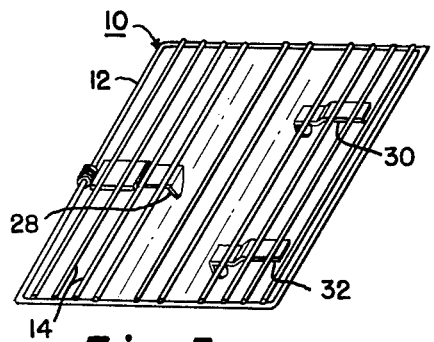
FIGURE 3 is an isometric view of the rack alone.

More particularly in the drawing, a rack 10 is shown which is of unitary construction and which includes a grating frame 12 formed of a single piece of wire bent into a rectangular shape and welded together at the adjacent ends of the wire. A series of parallel wires 14 is mounted in a layer atop the frame 12, these wires 14 being fixed by welding at their opposite ends to the frame to form a uniplanar open grating.

The rack 10 is detachably secured to the top of a pop-up toaster 16 of any of several conventional makes. The toaster 16 has toast slots 18 and 20, usually two in number and separated by a partition 22 which in many makes has a curved crown defining the highest point on the top of the toaster. Inside, the toaster contains regular vertical guides 24 for the slices to be toasted. It also contains the usual electric heating elements 26 which are energized for the timed cycle controlled by the same timer (not shown) which delays the pop-up mechanism 27. The slices are held in a depressed position in the usual way in the toaster until the toasting process has been completed. The cycle is started by manually depressing the mechanism 27.

The grating of our rack 10 is non-uniform in the respect that none of the parallel wires 14 is present in the wire pattern at gaps which occur in the grating in the vertical plane of the toaster slots 18 and 20. Each wire is approximately ¾ of an inch apart, center to center, from the next adjacent wire and in one physically constructed embodiment of the invention the gaps to clear slices from the toaster slots were 1⅜ inches wide.

A series of three metal support brackets 28, 30 and 32, connected to the underside of the rack 10, provides a 3 point suspension therefor, and each includes an identical depending toe 34, which is diagonally outwardly directed. The first bracket 28 is disposed at one side of the non-uniform gaps; the other two brackets 30 and 32 are at the opposite side of the gaps in a transversely aligned relation of one another, but in longitudinal misalignment with respect to the first bracket 28.

Each of the support brackets is of generally L-shape and has a main attachment leg 36 including a bend 38 and a rebend 40. The resulting step between the bends introduces a vertical offset $s$ (FIGURE 6) defining an offset or reentrant angled portion 42 of the leg which is below the main part of the leg. A foot portion 44 is perpendicular to the leg 36, being integrally joined at one end to the offset portion 42 and at the opposite end to the diagonal toe 34 of each bracket.

Figure 6:
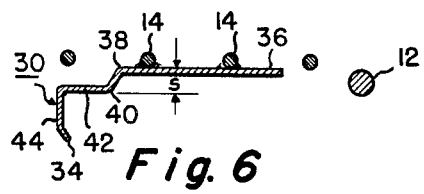
FIGURE 6 is a sectional view taken along the lines VI—VI of FIGURE 1, showing one of the fixed brackets in section.
Figure 7:
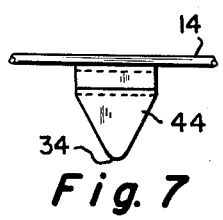
FIGURE 7 is an end view of the fixed bracket of FIGURE 6.

The attachment leg 36 of each bracket 30 and 32, as typified by the bracket 30 of FIGURE 6, is welded to each of two adjacent wires 14 of the grating thereabove.

The aforesaid first bracket 28 is a slide bracket which is slidably mounted in a C-shaped channel 46 welded to the underside of the adjacent grating wires 14. It differs from the other brackets in that a tongue 48 is diagonally deflected from the attachment leg to form a spring anchor for one end of a tension spring 50. The opposite end of the spring 50 is anchored to a hook 52 constituting the end terminal of a helix of wire 54 which is welded to an adjacent point on the grating frame 12.

Figure 2:
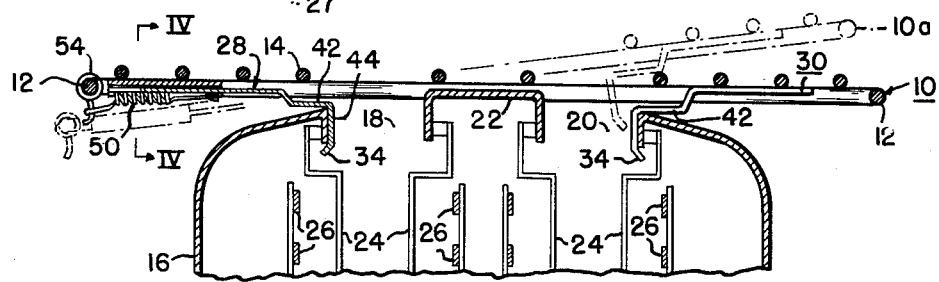
Figures 4, 5:
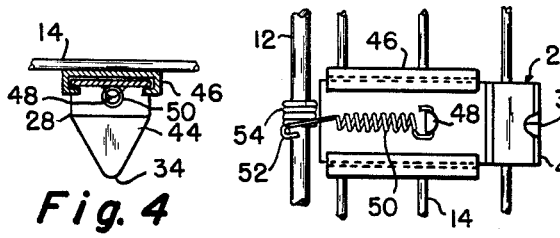
FIGURE 4 is a sectional view of the slide bracket of the rack taken along section lines IV—IV of FIGURE 2.
FIGURE 5 is a bottom plan view of the slide bracket.

Use of the rack 10 as a warming or cooling rack on a toaster is shown according to FIGURE 2. The offset and toe portions 42 and 44 respectively of each bracket support the rack in a triangulation of points adjacent the outer sides of the toaster slots 18 and 20. The diagonal toes 34 hook against the underside of the edges at the mouths of the toast slots to prevent unwanted dislocation of the rack in its position.

Attachment or detachment of the rack is accomplished with the rack in the dotted line position 10a appearing in FIGURE 2. The pressure to move the rack leftwardly, as viewed in FIGURE 2, into the dotted line position thereshown is sufficient to stretch the spring 50 and sufficiently decrease the distance between the brackets 28 and the pair of brackets 30 and 32. At that point, the brackets 30 and 32 are free either to be introduced into the slot 20 for installation or to be removed along with the bracket 28 by withdrawing the rack in its own plane to the right.

When the toaster is used in its warming function for articles supported on the rack, the mechanism 27 is operated through one or more cycles as desired except that there are no slices in the slots 18. Instead, these empty slots 18 operate with a flue effect directing heat upwardly by ordinary convection. Hence the articles are rapidly heated, especially if the cycles are made to follow one another consecutively for a period.

Figure 8:
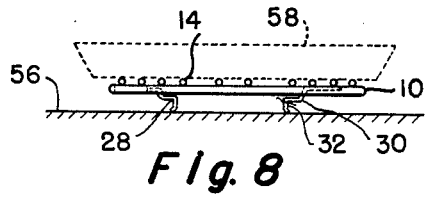
FIGURE 8 shows the rack supported on a flat surface.

Use of the bracket as a cookie or pie cooling rack is shown in FIGURE 8. The brackets 32, 30 and 28 rest firmly on a flat surface 56 so that their toes 34 provide the three point suspension indicated. Thus the rack 10 provides a non-tipping support for a tray or pan 58 of pastries for cooling. Its elevated position, due to the brackets 28, 30 and 32, enables the rack to be open at the bottom and sides for the free passage of air by convection.

In one physically constructed embodiment, the rack according to this invention measured 8¼ x 9¼ inches; the wire in the grating frame 12 was 11 gage; and the wire elements 14 were 13 gage wire.

It will be appreciated that the convective effects both for warming and cooling are very pronounced with the present rack owing to its open, parallel wire grating construction. The unitariness of the construction prevents it from collapsing and the positive bias of the spring 50, in conjunction with the bracket toes 34, insures positive securement on conventional pop-up toasters.

It will also be appreciated that the offset portion 42 of each bracket is sufficiently below the crown of the center section 22 of a curving crown toaster that there will be no interference between the crown and the center portion of the grid. It is essential that the foot portions 44 be fairly short to prevent the toe 34 from electrically shorting against the energized heating elements 26 of the variety of toasters encountered. In one physically constructed embodiment of the invention the overall vertical depth of the foot 44 and toe measured ½ inch.

Variations within the spirit and scope of the invention described are equally comprehended by the foregoing description.

We claim:
1. A warming and cooling rack for attachment to a toaster having pop-up slots comprising:
  (a) a uniplanar grating frame;
  (b) parallel wires affixed to the frame in closely spaced adjacency providing a grating;
  (c) gaps in said grating adapted to be located in the vertical plane of toaster pop-up slots whereby the grating does not obstruct access of bread slices to the toaster; and,
  (d) three supporting brackets affixed to the grating providing a three point suspension,
    (1) one bracket being slidably mounted to the grating adjacent one side of the gaps, and
    (2) a pair of said brackets being affixed to the grating adjacent the opposite side of said gaps.
2. A warming and cooling rack as defined in claim 1 in which each of the supporting brackets have a leg portion attached to the grating and a perpendicularly disposed foot portion extending downwardly from the leg portion to engage a toaster pop-up slot.
3. A warming and cooling rack as defined in claim 1 in which each of the supporting brackets have a leg portion attached to the grating, a portion of the leg being offset downwardly from the plane of the grating to prevent interference between the grating and the center portion of the toaster, a short foot portion extending perpendicularly downwardly from the offset portion of the leg and an outwardly bent toe portion extending from the foot portion providing positive engagement with a pop-up slot of the toaster.
4. A warming and cooling rack for attachment to a toaster having pop-up slots comprising:
  (a) a uniplanar grating frame;
  (b) parallel wires affixed to the frame in closely spaced adjacency providing a grating;
  (c) gaps in said grating adapted to be located in the vertical plane of toaster pop-up slots whereby the grating does not obstruct access of bread slices to the toaster;
  (d) a C shaped mounting channel affixed to the grating adjacent one side of the gaps;
  (e) a spring biased supporting bracket slidably positioned in said mounting channel.
    (1) said bracket having a leg portion positioned in the mounting channel and a foot portion extending perpendicularly downwardly from the leg portion to engage a toaster pop-up slot; and,
  (f) two similar brackets positioned adjacent the opposite side of the gaps, the leg portion of each of said brackets being affixed to the grating.

References Cited in the file of this patent
UNITED STATES PATENTS

| | | |
|---|---|---|
| 1,859,003 | Ragan | May 17, 1932 |
| 2,146,125 | Maski | Feb. 7, 1939 |
| 2,493,222 | Braught | Jan. 3, 1950 |
| 2,510,745 | Kilgore | June 6, 1950 |
| 2,828,685 | Ogle | Apr. 1, 1958 |
| 2,847,930 | Evans | Aug. 19, 1958 |
| 2,849,945 | Crowley | Sept. 2, 1958 |
| 2,940,379 | Kenney et al. | June 14, 1960 |
| 2,980,011 | Delk | Apr. 18, 1961 |